US007886075B2

(12) United States Patent
Molteni et al.

(10) Patent No.: US 7,886,075 B2

(45) Date of Patent: Feb. 8, 2011

(54) ARRANGEMENT FOR RETRIEVING ROUTING INFORMATION FOR ESTABLISHING A BIDIRECTIONAL TUNNEL BETWEEN A MOBILE ROUTER AND A CORRESPONDENT ROUTER

(75) Inventors: Marco Molteni, Antibes (FR); Pascal Thubert, La Colle sur Loup (FR); Patrick Wetterwald, Cagnes sur Mer (FR); Massimo Villari, Messina (IT); Eric M. Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 1757 days.

(21) Appl. No.: 10/438,853

(22) Filed: May 16, 2003

(65) Prior Publication Data

US 2004/0228343 A1 Nov. 18, 2004

(51) Int. Cl.
*G06F 15/173* (2006.01)

(52) U.S. Cl. ....................... 709/238; 709/239; 709/240; 709/241; 709/242

(58) Field of Classification Search ................. 709/238, 709/239, 240, 242, 225, 223, 227, 228, 229
See application file for complete search history.

(56) References Cited

U.S. PATENT DOCUMENTS

| | | | | |
|---|---|---|---|---|
| 6,178,451 | B1 * | 1/2001 | Huitema et al. | 709/224 |
| 6,300,863 | B1 * | 10/2001 | Cotichini et al. | 340/5.8 |
| 6,421,781 | B1 * | 7/2002 | Fox et al. | 726/4 |
| 6,446,133 | B1 * | 9/2002 | Tan et al. | 709/245 |
| 6,578,085 | B1 * | 6/2003 | Khalil et al. | 709/241 |
| 6,907,525 | B2 | 6/2005 | Pazi et al. | |
| 6,993,588 | B2 * | 1/2006 | Davis et al. | 709/229 |
| 7,020,464 | B2 * | 3/2006 | Bahl et al. | 455/432.1 |
| 7,333,482 | B2 * | 2/2008 | Johansson et al. | 370/353 |
| 7,552,234 | B2 * | 6/2009 | Thubert et al. | 709/238 |
| 2001/0047429 | A1 * | 11/2001 | Seng et al. | 709/245 |
| 2002/0029287 | A1 * | 3/2002 | Yemini et al. | 709/238 |

(Continued)

OTHER PUBLICATIONS

Crawford et al., RFC 2874—DNS Extensions to Support IPv6 Address Aggregation and Renumbering, Network Working Group, RFC: 2874, Category: Standards Track, Jul. 2000, discloses the standardization of IPv6 DNS.*

(Continued)

*Primary Examiner*—Saleh Najjar
*Assistant Examiner*—Edward J Kim
(74) *Attorney, Agent, or Firm*—Leon R. Turkevich

(57) ABSTRACT

A mobile router and a correspondent router, each configured for routing services for nodes within their routing prefixes associated with their respective routing tables, establish a secure, bidirectional tunnel based on a messaging protocol between each other and a route server resource. A reactive (i.e., on-demand) protocol is used that enables the requesting device (e.g, the mobile router, correspondent router), to obtain routing information in a secure manner from the route server. The mobile router sends a query via its home agent to the route server resource to identify the correspondent router serving the correspondent node. The mobile router sends a binding update request, specifying a home address and care-of address for the mobile router, to the correspondent router for establishment of a bidirectional tunnel. The correspondent router establishes the bidirectional tunnel, and updates its routing tables based on information from the route server resource.

39 Claims, 7 Drawing Sheets

U.S. PATENT DOCUMENTS

| | | | | |
|---|---|---|---|---|
| 2002/0080752 | A1 * | 6/2002 | Johansson et al. | 370/338 |
| 2002/0131602 | A1 * | 9/2002 | Ishii | 380/278 |
| 2002/0138634 | A1 * | 9/2002 | Davis et al. | 709/229 |
| 2002/0138649 | A1 | 9/2002 | Cartmell et al. | |
| 2003/0021275 | A1 * | 1/2003 | Shabeer | 370/393 |
| 2003/0039240 | A1 * | 2/2003 | Sutanto | 370/352 |
| 2003/0074461 | A1 | 4/2003 | Kang et al. | |
| 2004/0030917 | A1 * | 2/2004 | Karamchedu et al. | 713/200 |
| 2004/0068665 | A1 * | 4/2004 | Fox et al. | 713/201 |
| 2004/0137888 | A1 | 7/2004 | Ohki | |
| 2004/0177120 | A1 * | 9/2004 | Kirsch | 709/206 |
| 2004/0181571 | A1 * | 9/2004 | Atkinson et al. | 709/200 |
| 2004/0202183 | A1 * | 10/2004 | Thubert et al. | 370/395.31 |
| 2004/0205233 | A1 * | 10/2004 | Dunk | 709/238 |
| 2004/0264465 | A1 | 12/2004 | Dunk | |

OTHER PUBLICATIONS

Yuji Sekiya, IPv6 DNS Setup Information, www.isi.edu/manning/v6DNS.html, Jan. 31, 2000, discloses reverse DNS lookup in IPv6, mobile IPv6.*

Johnson et al., Mobility Support in IPv6 draft-ietf-mobileip-ipv6-20.txt, IETF Mobile IP Working Group, Internet-draft, Jan. 20, 2003.*

Web page at http://tldp.org/LDP/nag/node37.html, titled "Name Lookups with DNS", as captured and archived by the "WAYBACK Machine" at http://web.archive.org on the date of Jun. 14, 2002.*

Huji, "DNS: Domain Name System", DNS tutorial found at httpdyn.cs.huji.ac.il/moodles/cs08/mod/resource/view.php?id=1469.*

Dubberly Design Office, "Domain Name System", pictorial representation/map of the Domain Name System prepared by Dubberly Design Office found at http://www.dubberly.com/wp-content/uploads/2008/06/ddo_dns.pdf.*

Snoeren et al., "An end-to-end approach to host mobility", International Conference on Mobile Computing and Network, Proceedings of the 6th annual international conference on Mobile computing and networking, pg. 1550166, 2000, ISBN: 1-58113-197-6.*

Thubert et al., "Taxonomy of Route Optimization models in the Nemo Context", draft-thubert-nemo-ro-taxonomy-00, Oct. 11, 2002.*

Johnson et al., "Mobility Support in IPv6", IETF Mobile IP Working Group, Internet Draft, draft-ietf-mobileip-ipv6-20.txt, Jan. 20, 2003.

Garcia-Luna-Aceves, "Source Tree Adaptive Routing (STAR) Protocol", IETF MANET Working Group, Internet Draft, draft-ietf-manet-star-00.txt, Oct. 22, 1999.

Ohnishi et al, "Mobile IP Border Gateway (MBG)", Mobile IP Working Group, Internet Draft, draft-ohnishi-mobileip-mbg-00.txt, Jul. 2001.

Nemeth et al, UNIX System Administration Handbook, 2001, pp. 404-409 and 436- 437, Prentice Hall PTR, Upper Saddle River, NJ.

Thubert et al., "Taxonomy of Route Optimization models in the Nemo Context", Network Working Group, Internet Draft, draft-thibert-nemo-ro-taxonomy-00, Oct. 11, 2002, pp. 1-12.

Kniveton et al., "Mobile Router Tunneling Protocol" <draft-kniveton-mobrtr-03.txt>, NEMO Working Group, Internet Draft, Nov. 1, 2002, pp. 1-17.

Thubert et al., "IPv6 Reverse Routing Header and its application to Mobile Networks" <draft-thubert-nemo-reverse-routing-header-01>, Network Working Group, Internet Draft, Oct. 11, 2002, pp. 1-37.

* cited by examiner

ARRANGEMENT FOR RETRIEVING ROUTING INFORMATION FOR ESTABLISHING A BIDIRECTIONAL TUNNEL BETWEEN A MOBILE ROUTER AND A CORRESPONDENT ROUTER

BACKGROUND OF THE INVENTION

1. Field of the Invention

The present invention relates to route optimization between mobile routers of a mobile network, for example a mobile IP network (NEMO) or an Internet Protocol (IP) based mobile ad hoc network (MANET), and a correspondent node.

2. Description of the Related Art

Proposals have been made by Internet Engineering Task Force (IETF) groups for improved mobility support of Internet Protocol (IP) based mobile devices (e.g., laptops, IP phones, personal digital assistants, etc.) in an effort to provide continuous Internet Protocol (IP) based connectivity. The IETF has two working groups focusing on mobile networks, a Mobile Ad-hoc Networks (MANET) Working Group that is working to develop standardized MANET routing specification(s) for adoption by the IETF, and NEMO (mobile networks). NEMO uses Mobile IP (MIP) to provide connectivity between mobile networks and the infrastructure (e.g., the Internet). The key component in NEMO is a mobile router that handles MIP on behalf of the mobile networks that it serves.

According to the MANET Working Group, the "mobile ad hoc network" (MANET) is an autonomous system of mobile nodes connected by wireless or wired links—the union of which form an arbitrary graph. The nodes are free to move randomly and organize themselves arbitrarily; thus, the network's wireless topology may change rapidly and unpredictably. Such a network may operate in a standalone fashion, or may be connected to the larger Internet.

A "Mobile IPv6" protocol is disclosed in an Internet Draft by Johnson et al., entitled "Mobility Support in IPv6", available on the World Wide Web at the address: http://www.ietf.org/internet-drafts/draft-ietf-mobileip-ipv6-20.txt (the disclosure of which is incorporated in its entirety herein by reference). According to Johnson et al., the Mobile IPv6 protocol enables a mobile network host to move from one link to another without changing the mobile network host's IP address. Hence, a mobile network host is always addressable by its "home address", an IP address assigned to the mobile network host within its home subnet prefix on its home link. Packets may be routed to the mobile network host using this address regardless of the mobile network host's current point of attachment to the Internet. The mobile network host may also continue to communicate with other hosts (stationary or mobile) after moving to a new link. The movement of a mobile network host away from its home link is thus transparent to transport and higher-layer protocols and applications.

In addition, Johnson et al. assumes that use of Mobile JPv6 eliminates the need to deploy special routers as "foreign agents" as are used in Mobile TPv4. In Mobile IPv6, mobile network hosts make use of IPv6 features, to operate in any location without any special support required from the local router.

Existing Internet Drafts for NEMO do not optimize the path to an arbitrary correspondent node (CN), let alone providing a secure, optimized path. One proposal for route optimization is provided by the Internet Draft by Ohnishi et al., entitled "Mobile IP Border Gateway (MBG)", available on the World Wide Web at the address: http://www.ietf.org/internet-drafts/draft-ohnishi-mobileip-mbg-00.txt as well as the World Wide Web address http://www.mobile-ip.de/ftp/pub/ietf/drafts/draft-ohnishi-mobileip-mbg-00.txt (the disclosure of which is incorporated in its entirety herein by reference). As recognized by Ohnishi et al., the current Mobile IP specification forces all packets forwarded to a mobile node (MN) from a correspondent node (CN) to be routed via that mobile node's home agent: this routing via the home agent often leads to triangular routing, which in turn causes data transmission delay and wastes network resources.

However, the MBG proposed by Ohnishi et al. is limited to optimizing routes within the internal network of an Internet Service Provider (ISP). Hence, relatively inefficient triangular routing may still become prevalent between a mobile node and the correspondent node in cases where the MN or the CN are outside a prescribed ISP.

SUMMARY OF THE INVENTION

Commonly-assigned, copending application Ser. No. 10/361,512, filed Feb. 11, 2003, entitled ARRANGEMENT FOR ESTABLISHING A BIDIRECTIONAL TUNNEL BETWEEN A MOBILE ROUTER AND A CORRESPONDENT NODE, the disclosure of which is incorporated in its entirety by reference, discloses a mobile router and a correspondent router, each configured for routing services for nodes within their routing prefixes associated with their respective routing tables, configured for establishing between each other a secure, bidirectional tunnel. The bidirectional tunnel is based on a messaging protocol between each other and a route server resource having a prescribed security relationship with the mobile router and correspondent router. The mobile router sends a query via its home agent to the route server resource to identify the correspondent router serving the correspondent node. The mobile router sends a binding update request, specifying a home address and care-of address for the mobile router, to the correspondent router for establishment of a bidirectional tunnel. The correspondent router, upon validating the home address is reachable via the care-of address, establishes the bidirectional tunnel, and updates its routing tables to specify that prescribed address prefixes are reachable via the mobile router home address.

The present invention provides an arrangement that enables the requesting routers (e.g., the mobile router and the correspondent router) to obtain routing information from a routing information source. In particular, the present invention provides a reactive (i.e., on-demand) protocol that enables the requesting device (e.g, the mobile router, correspondent router), to obtain routing information in a secure manner for establishment of the bidirectional tunnel.

One aspect of the present invention provides a method in an Internet Protocol (IP) based mobile router configured for sending packets to a correspondent node. The method includes receiving a packet destined for IP address of the correspondent node, and determining a host domain name associated with the IP address by requesting a reverse lookup of the IP address from a name server. The method also includes identifying an authoritative name server for the host domain name based on sending a query, specifying the host domain name, to a root name server configured for identifying a top-level authoritative name server, and sending a second query, specifying the host domain name, to the top-level authoritative name server. The method also includes sending to the authoritative name server a request for identifying a correspondent router configured for establishing a tunnel for the host domain name, and initiating establishment of the tunnel with the correspondent router for sending packets to the correspondent node.

Another aspect of the present invention provides a method in an Internet Protocol (IP) based router configured for sending and receiving packets for a correspondent node. The method includes establishing a bidirectional tunnel with a mobile router based on receiving a binding update that specifies a home address for the mobile router and a care-of address that specifies a point of attachment for the mobile router. The method also includes determining a domain name associated with the home address by requesting a reverse lookup of the home address from a name server, and identifying an authoritative name server for the domain name based on sending a query, specifying the domain name, to a root name server configured for identifying a top-level authoritative name server, and sending a second query, specifying the domain name, to the top-level authoritative name server. The method also includes sending to the authoritative name server a request for identifying at least one address prefix reachable via the mobile router, and updating an internal routing table to indicate the at least one address prefix is reachable via the bidirectional tunnel.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The disclosed embodiment is directed to providing a reactive route server protocol that enables requesting routers, for example a mobile router (MR) or a correspondent router (CR), to obtain routing information in order to implement optimized routing via a bidirectional tunnel. A description of the reactive route server protocol will be provided in the context of the route optimization disclosed in the above-incorporated application Ser. No. 10/361,512.

Figure 1:
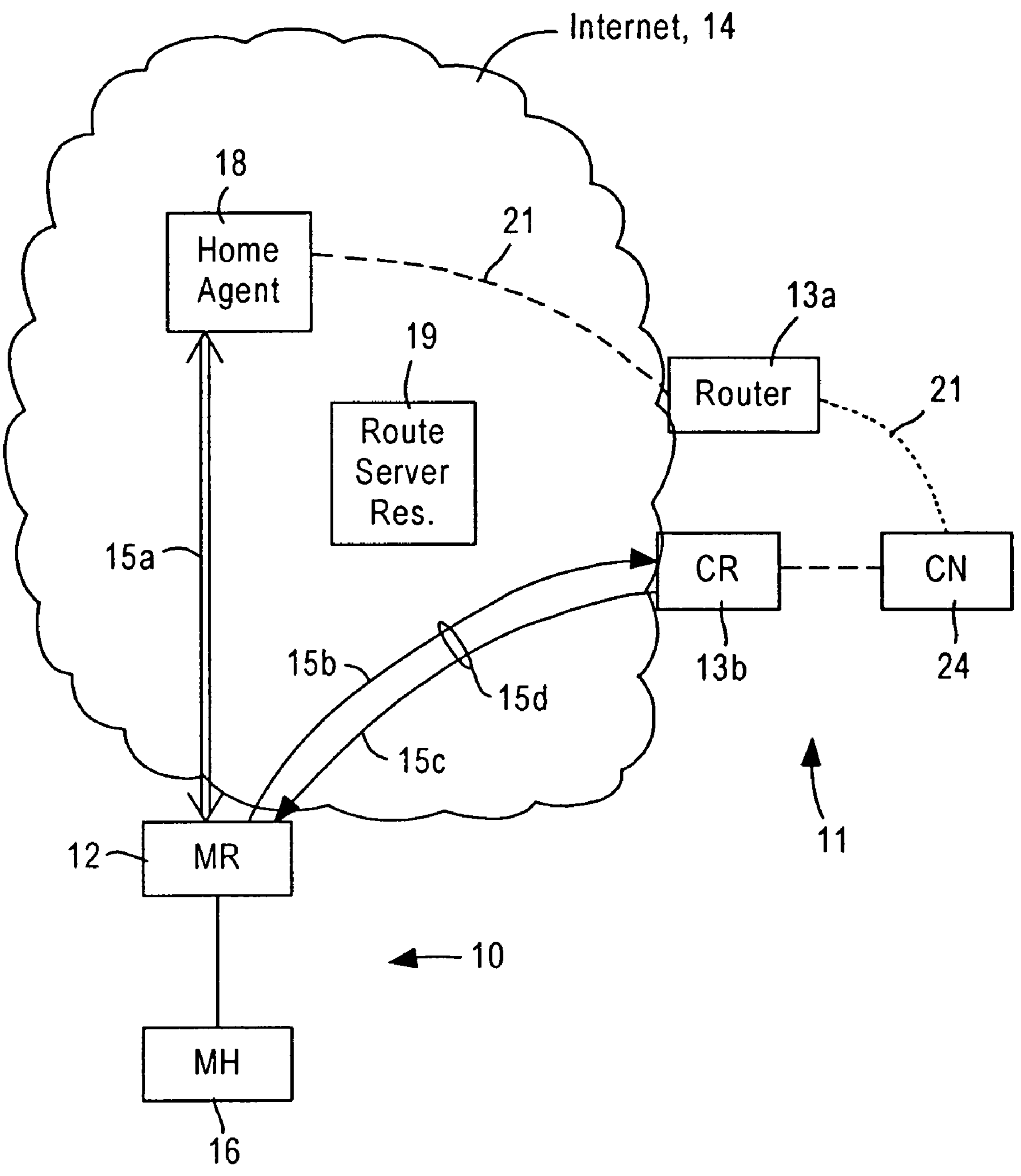
FIG. 1 is a diagram illustrating a network, including a mobile network in communication with a second network via a wide area network, such as the Internet, based on establishing a bidirectional tunnel between the two networks, according to an embodiment of the present invention.

FIG. 1 is a diagram, reproduced from the above-incorporated application Ser. No. 10/361,512, illustrating a mobile network 10 having a mobile router (MR) 12 and a mobile network host (MNH) 16 configured for communications via a wide area network 14 such as the Internet, according to an embodiment of the present invention. The mobile router 12 is configured for providing connectivity for the mobile network host 16 with the wide area network 14, for example the Internet, using mobile IPv6 protocol. In particular, the mobile router 12 is configured for routing data packets from the mobile network host 16 to a correspondent node 24.

Conventional approaches for routing packets between the mobile network host 16 and the correspondent node 24 involve the mobile router 12 sending the packets via a home agent 18 through a bidirectional tunnel 15*a*. The home agent 18, upon receiving the packets via the tunnel 15*a*, route the packet to a router 13 (e.g., 13*a*) identified by existing routing protocols to provide reachability for the correspondent node 24.

The disclosed embodiment expands on the above-incorporated Ohnishi et al. and the Internet Draft by Thubert et al. (inventors of the subject application), entitled "Taxonomy of Route Optimization models in the Nemo context" available on the World Wide Web at the address: http://www.ietf.org/internet-drafts/draft-thubert-nemo-ro-taxonomy-00.txt and the disclosure of which is incorporated in its entirety by reference.

In particular, the disclosed embodiment enables the mobile router 12 and the correspondent router 13*b* to independently establish a bidirectional tunnel 15*d* for optimized routing of packets between address prefixes served by the respective mobile router 12 and the correspondent router 13*b*. The mobile router 12 and the correspondent router 13*b* each utilize a route server resource, illustrated in FIG. 1 as a route server resource 19 for simplicity. The route server resource 19 provides identification of relevant addressing information enabling the mobile router 12 and the correspondent router 13*b* to establish optimized routes via the bidirectional tunnel 15*d*. As described below with respect to FIG. 4A, the mobile router 12 is configured for obtaining information from the route server resource 19 that identifies the correspondent router 13*b* as providing reachability for the correspondent node 24; the mobile router 12 also is configured for obtaining address prefix information of the subnetwork 11 from the route server resource 19, enabling the mobile router to utilize the bidirectional tunnel 15*d* for multiple nodes within the subnetwork 11.

The correspondent router 13*b* is configured for route optimization on behalf of nodes such as the correspondent node 24 within its associated subnetwork 11 (i.e., sharing the same topological group of address prefixes). As described below with respect to FIG. 4B, the correspondent router 13*b* is configured for responding to establishment of the bidirectional tunnel 15*d* by requesting from the route server resource 19 the address prefix for the mobile network host 16, or all address prefixes for the mobile network 10.

The route server resource 19, illustrated in FIG. 1 as a single resource having a presence on the Internet 14, is configured for providing address and routing information to the correspondent router 13*b* and the mobile router 12, based on distinct security associations (i.e., trusted relationships) with each of the routers: the route server resource 19 has a prescribed security association with the mobile router 12, and the route server resource has another prescribed security association with the correspondent router 13*b* that is distinct from the security association with the mobile router 12. The route server resource may obtain its information from, for example, configuration by a local administrator, exchanges with other route server resources (e.g., according to BGP protocol), registration with the corresponding router, or an external trusted source such as a directory service.

Figure 4A:
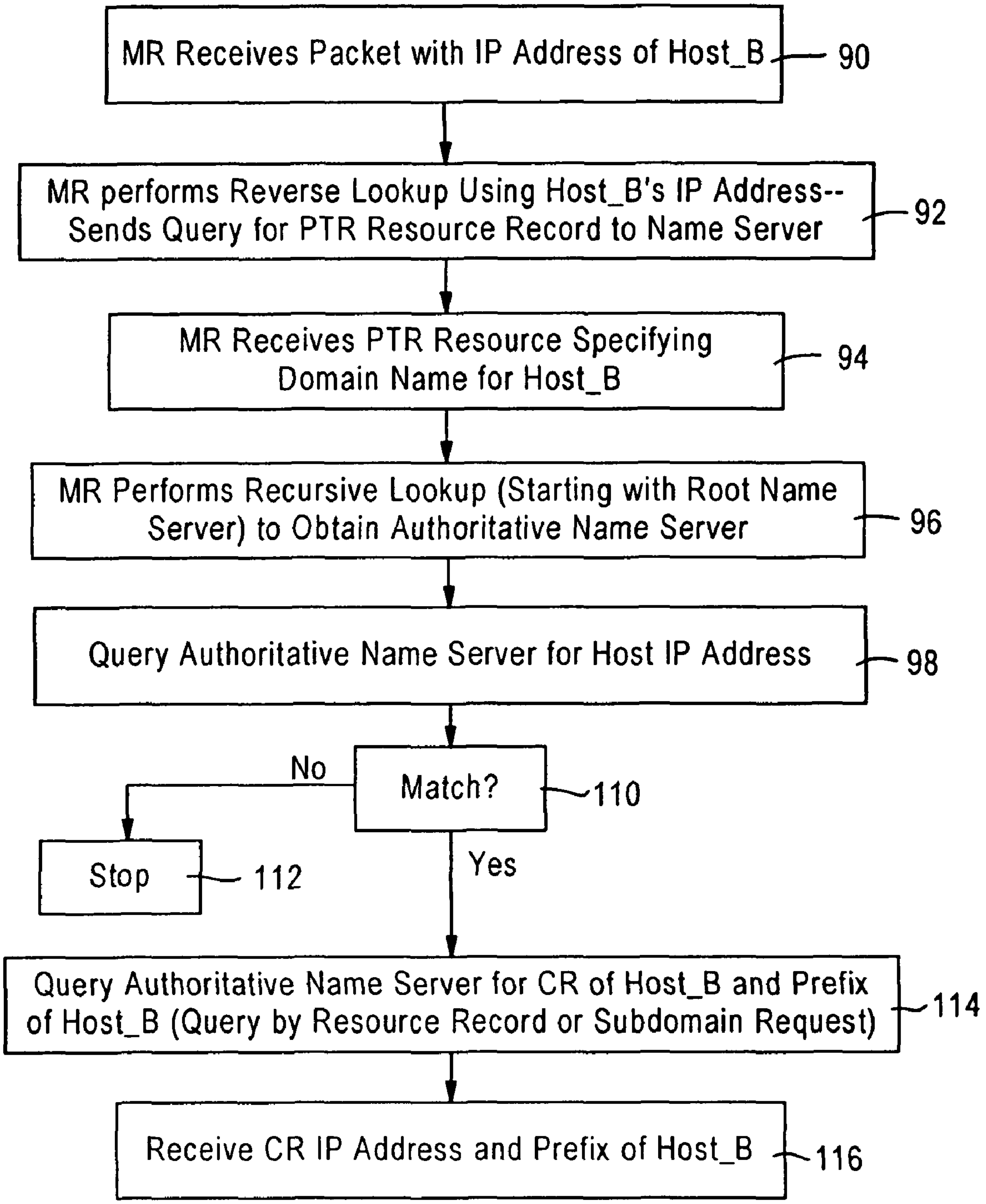
FIGS. 4A and 4B are diagrams summarizing the method by the mobile router and the correspondent router, respectively, of obtaining routing information from a route server for establishment and use of a bidirectional tunnel, according to an embodiment of the present invention.
Figure 4B:
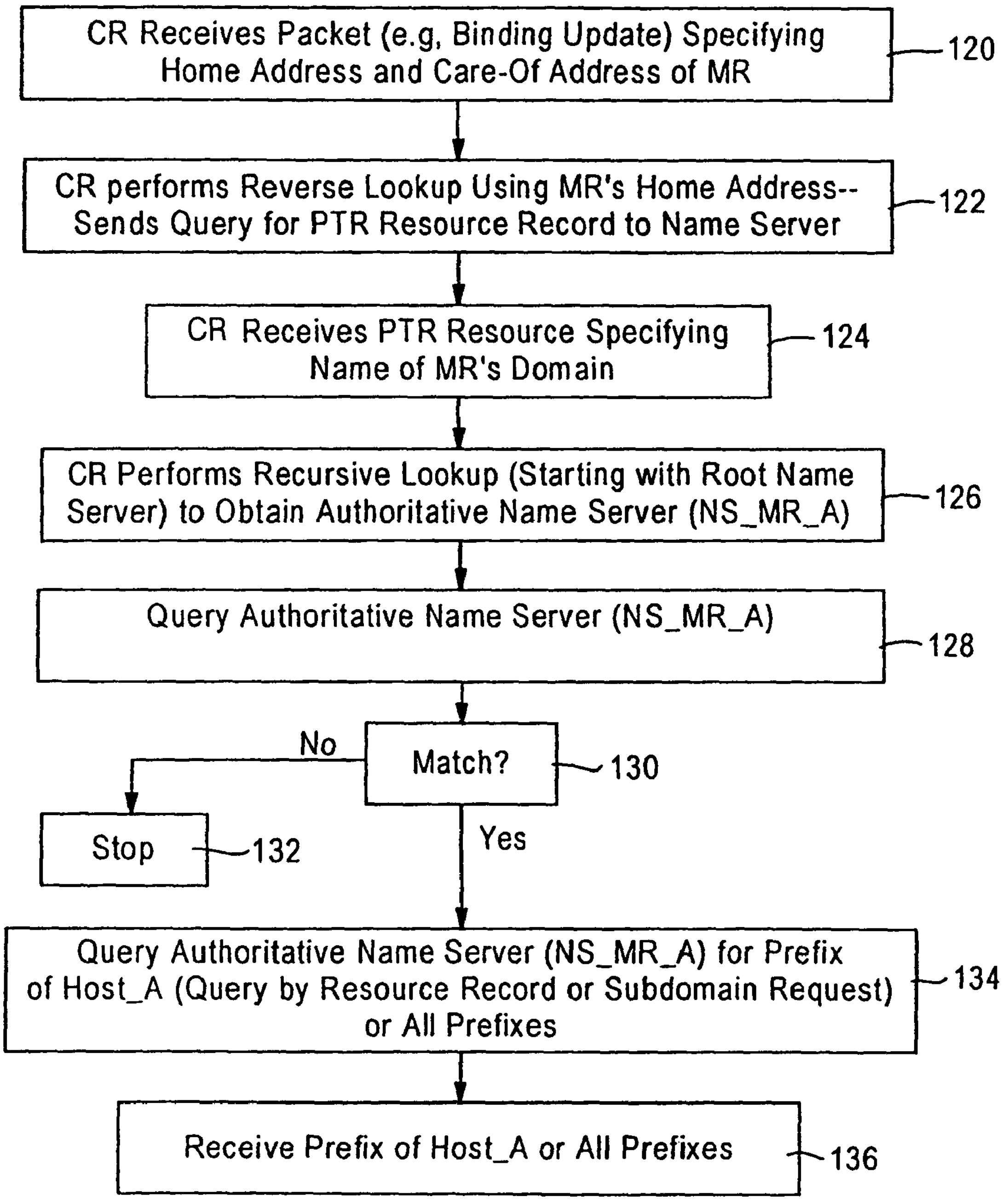
Figure 5:
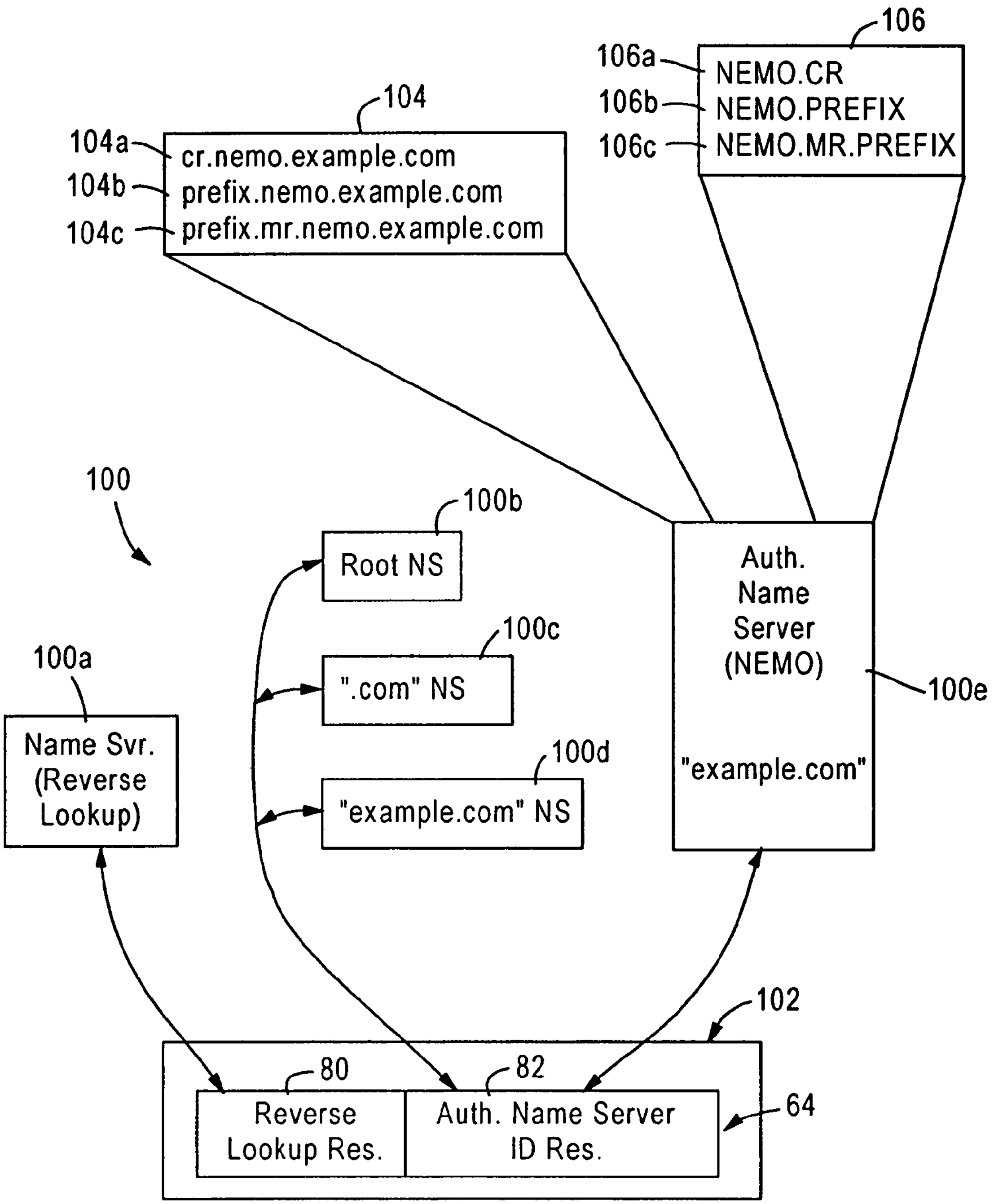
FIG. 5 is a diagram illustrating the recursive queries executed by a query resource in obtaining routing information.

FIG. 5 is a diagram illustrating in detail an exemplary implementation of the route server resource 19. As described below with respect to FIGS. 4-6, the route server resource 19 is implemented as a group of name servers 100, illustrated in FIG. 5, that includes name servers 100*a* configured for providing reverse lookup services (IP address to name translations) by supplying Pointer (PTR) resource records, and authoritative name servers 100*b*, 100*c*, 100*d*, and 100*e* that provide trusted (i.e., guaranteed to be accurate) forward lookup services (name to IP address translations) by supplying uncached Type A or Type A6 (IPv6) resource records. In particular, the use of uncached resource records, typically by executing recursive lookups to identify an authoritative name server 100*e* for a destination host, ensures that the received routing information is accurate.

The disclosed routers of FIG. 1, shown generically in FIG. 5 as a router 102, each include a query resource 64. The query resource 64 includes a reverse lookup resource 80, and an authoritative name server identifier resource 82. The reverse lookup resource 80 is configured for identifying a host domain name associated with an IP address by requesting a reverse lookup of the IP address.

In particular, the reverse lookup resource 80 determines the host domain name associated with an IP address by requesting a reverse lookup of the IP address from the name server 100*a*. In response to receiving a resource record specifying a host domain name (e.g., hostA.example.com), the authoritative name server identifier resource 82 initiates a forward lookup by sending a query specifying the host domain name to a prescribed authoritative root domain server 100*b*. The root domain server 100*b* refers the router 102 to an authoritative name server 100*c* for the ".com" domain, causing the authoritative name server identifier resource 82 to send the query to the name server 100*c*. The authoritative domain server 100*c* refers the router 102 to an authoritative name server 100*d* for the "example.com" domain, causing the authoritative name server identifier resource 82 to send the query to the name server 100*d*. The authoritative domain server 100*d* refers the router 102 to an authoritative name server 100*e*.

Hence, the authoritative name server identifier resource 82 recursively queries the domain name servers 100*b*, 100*c*, and 100*d*, as needed to send the query to the authoritative name server 100*e* configured for supplying a resource record in response to the request. The name server 100*e* may be configured for storing the resource records in prescribed subdomains 104, or as new resource record types 106. Additional details of the storage of resource records is described below with respect to FIGS. 6A and 6B.

Hence, the mobile router 12 and the correspondent router 13*b* can perform "safe" reverse lookups to obtain routing information for completion of the route optimization, based on recursive queries to authoritative name servers.

Hence, the mobile router 12, having a trusted relationship with its corresponding authoritative name server, is registered with the route server resource 19 based on registration of the mobile router in an authoritative name server for the home agent 18, for identification of address prefixes served by the mobile router 12. The correspondent router 13*b*, which also has a trusted relationship with its corresponding authoritative name server, is registered with the route server resource 19 based on registration with the corresponding authoritative name server by supplying its IP address, and all address prefixes served by the correspondent router 13*b*. Hence, the route server resource 19 of FIG. 1 (implemented in this example using the authoritative name servers) is able to associate an address prefix to a registered router, enabling the registered routers to query the route server resource 19 for identification of routers that can provide optimized paths to the respective subnet prefixes.

Hence, the mobile router 12 and the correspondent router 13*b* can obtain routing information from the route server resource 19 based on the respective security associations, even if the mobile router 12 and the correspondent router 13*b* do not have any initial security association between each other. As described with respect to FIG. 5, the route server resource 19 is implemented across multiple name servers that perform secure forward and reverse address translation according to a prescribed query protocol such as Domain Name System (DNS) protocol according to RFC 1034, RFC 1035, and more recently published (and known) RFCs. Note that Lightweight Directory Access Protocol (LDAP) according to RFC 3377 may be implemented as an alternative to DNS protocol.

Note that the disclosed arrangement enables the mobile router 12 to discover the correspondent router 13*b* even if the correspondent router 13*b* is not readily detectable by existing routing protocols. In particular, existing routing protocols may specify the router 13*a* as serving the correspondent node 24, and where the correspondent node 24 initially identifies the router 13*a* as its default router. As described below, route optimization includes identifying to the mobile router 12 that the correspondent router 13*b* is able to serve the correspondent node 24, and, establishing the bidirectional tunnel 15*d* based on specific verification procedures, and advertising by the correspondent router 13*b* to nodes within its associated address prefixes that address prefixes served by the mobile router 12 are reachable via the correspondent router 13*b*.

The correspondent router 13*b* may be implemented as a fixed router, in which case it may be collocated with its route server resource 19, and represent a large number of address prefixes from its autonomous system. Note that the represented prefixes are not necessarily attached to the correspondent router 13*b*, and as described above the correspondent router 13*b* may not be on the default path 21 between the represented prefixes and the Internet infrastructure. The correspondent router 13*b* also may be implemented as a mobile router 12, in which case it may perform mobile IP route optimization with the peer mobile router (which in turn plays a correspondent router role).

Figure 2:
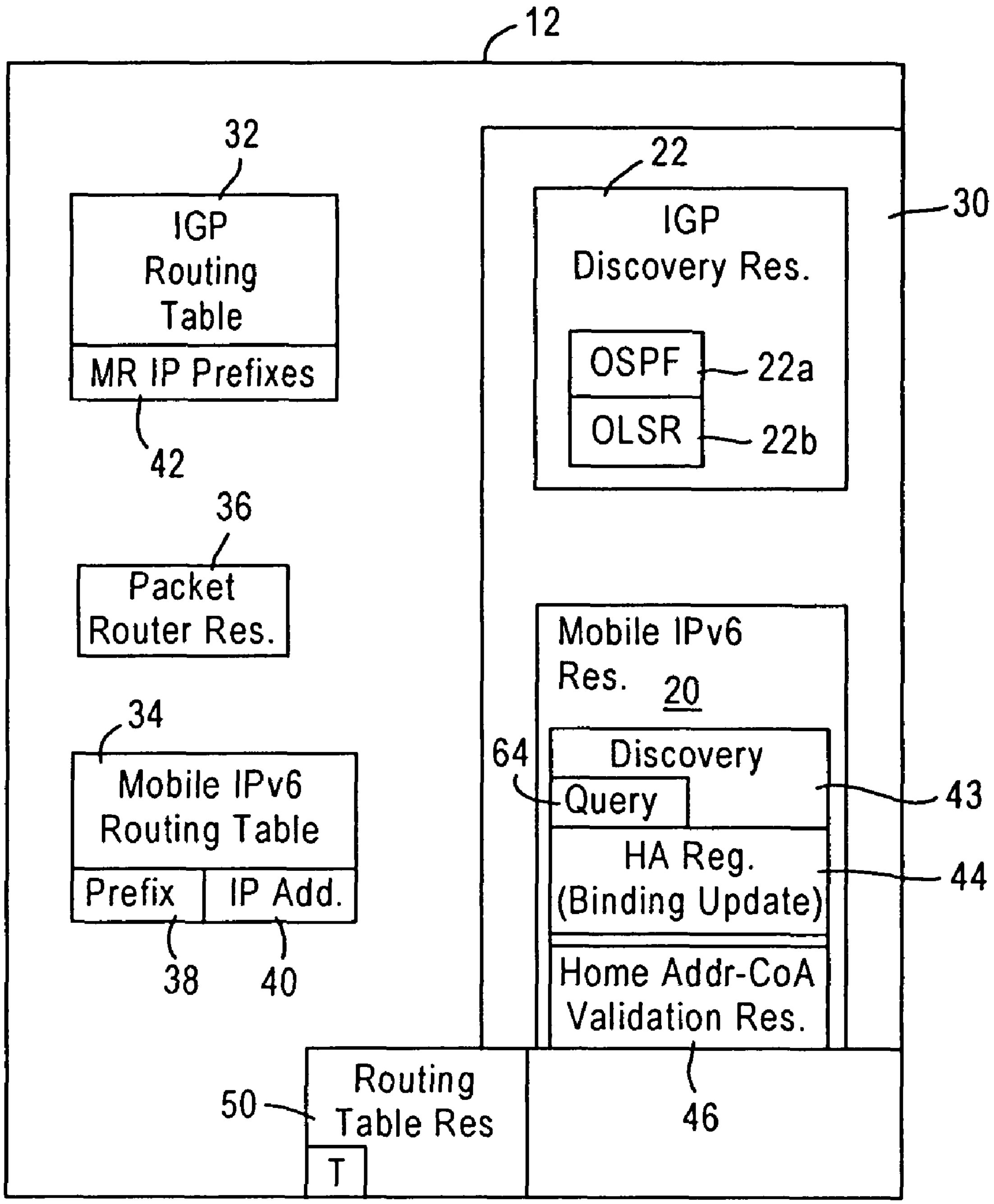
FIG. 2 is a diagram illustrating in detail the mobile router of FIG. 1.

FIG. 2 is a diagram illustrating in detail the mobile router 12, according to an embodiment of the present invention. The mobile router 12 includes an Internet protocol (IP) interface 30, including mobile IPv6 protocol resources 20 configured for execution of mobile IPv6 protocol communications with an access router (not shown) of the wide area network 14. The IP interface 30 also may optionally include Interior Gateway routing protocol (IGP) resources 22 configured for execution of IGP communications within the local network 10; in this case, the mobile router also may optionally include an IGP routing table 32. The mobile router 12 also includes a mobile IPv6 routing table 34, a packet router resource 36, and a routing table resource 50 having an expiration timer (T).

The IGP resource 22 may be implemented using either a conventional routing protocol such as Routing Information Protocol (RIP) or Open Shortest Path First (OSPF), or an ad-hoc routing protocol such as Ad hoc On Demand Distance Vector (AODV) or Optimized Link State Routing (OLSR).

For example, exemplary proactive IGP resources 22 that may be utilized for identifying the mobile network hosts 16 include an Open Shortest Path First (OSPF) (ver. 3) resource 22*a*, configured for monitoring link connectivity information advertised by each mobile network host 16 and maintaining a routing table 32; another routing protocol that may be used is Source Tree Adaptive Routing (STAR) protocol, described in an Internet Draft by J. J. Garcia-Luna-Aceves et al., available from the IETF on the World Wide Web at http://www.ietf.org/proceedings/99nov/I-D/draft-ietf-manet-star-00.txt. The routing table 32 is configured for storing IP address prefixes 42 of the mobile routers and associated connectivity and routing information (e.g., link state status, etc.). The protocol resources 22 also may include an ad-hoc routing protocol resource such as an Optimized Link State Routing (OLSR) Protocol resource 22*b*, configured for identifying the mobile routers 16 using hello messages and link state flooding to populate the routing table 32.

The packet router resource 36 is configured for forwarding packets received via tunnel connections (e.g., 15*a*, 15*d*) to the destination (e.g., mobile network host 16) based on the subnet information 38 stored in the routing table.

Figure 6A:
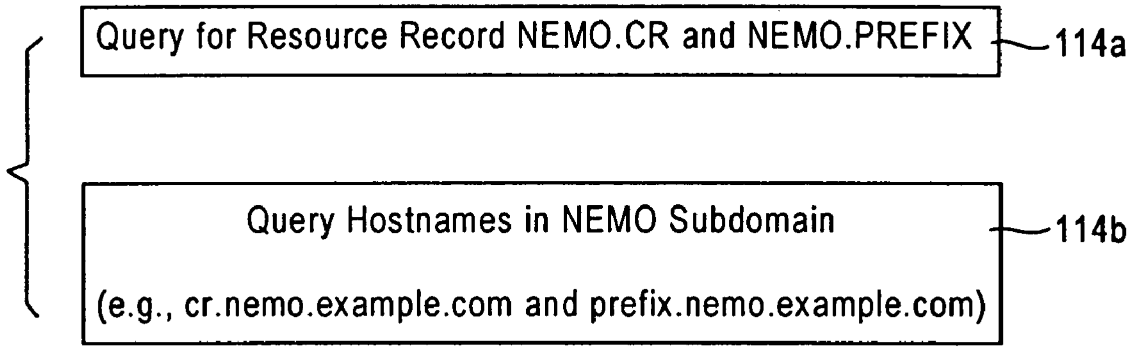
FIGS. 6A and 6B are diagrams illustrating query types generated by the mobile router and the correspondent router, respectively.
Figure 6B:
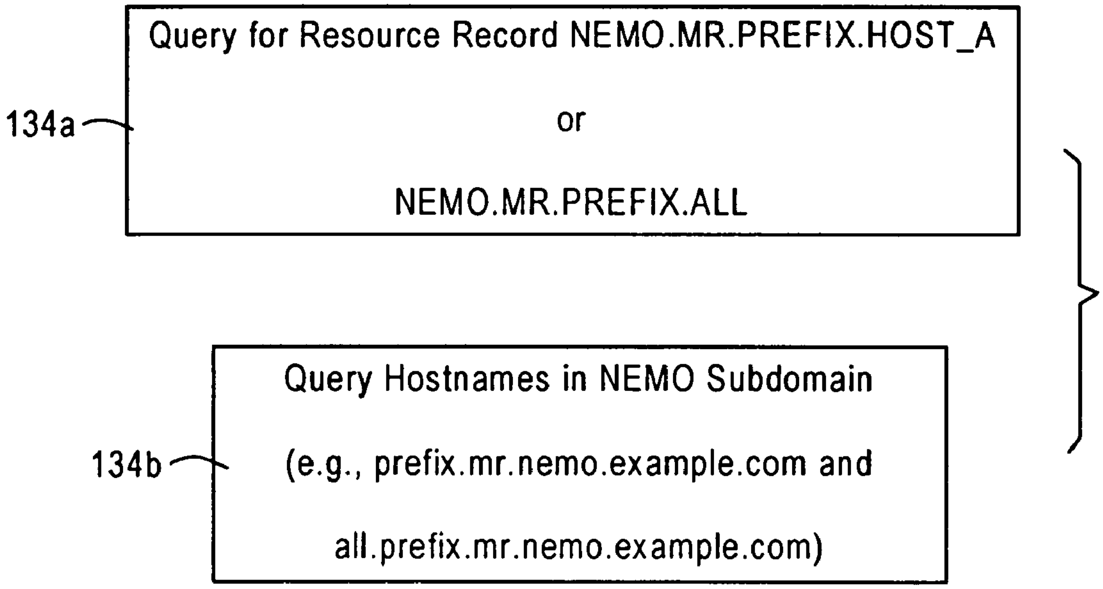

The mobile IPv6 resource 20 is configured for sending a query, via the tunnel 15*a* terminated by the home agent 18, to the route server resources, illustrated as the resource 19 in FIG. 1 and route servers 100 in FIG. 5. The query, described in detail below with respect to FIGS. 4A and 6A, is generated by a discovery resource 43, configured for populating the mobile IPv6 routing table 34. The discovery resource 43 includes the query resource 64 of FIG. 5 for generating queries to the route server resources 100 for establishment of the unidirectional tunnel 15*b*, and the bidirectional tunnel 15*d*, described below. The discovery resource 43 also is configured for receiving a binding acknowledgment from the correspondent node 13*b* during formation of the unidirectional tunnel 15*c* that results in the formation of the bidirectional tunnel 15*d*, described below.

The mobile IPv6 resource 20 also includes a home agent registration resource (i.e., a binding update resource) 44 configured for registering the mobile router 12 (and optionally each node 16 associated with a given subnet prefix) with the corresponding home agent 18 by sending a binding update message. Additional details relating to mobile router registration are provided in the above-incorporated Internet Draft by Johnson et al.

The binding update resource 44 also is configured for sending a binding update request to the correspondent router 13*b* in an attempt to establish the bidirectional tunnel 15*d*. In particular, once the discovery resource query 64 has received a reply from the route server resource 19 that identifies the correspondent router 13*b* serving the correspondent node 24, the routing table resource 50 can update the routing table 34 to specify the IP address 40 for the correspondent router 13*b* and the correspondent subnet prefix 38.

Once the routing table resource 50 has updated the routing table 34 to identify that the address prefix 38 for the correspondent node 24 is reachable via a tunnel to the correspondent node 13*b* (identified by its corresponding IP address 40), the packet router resource 36 can route packets to the correspondent router 13*b* via the unidirectional tunnel 15*b*, eliminating the necessity that the packets to the correspondent router 13*b* be sent via the tunnel 15*a* terminated by the home agent 18.

The IPv6 interface resource 20 also includes a home address/care-of address validation resource 46 configured for requesting an IPv6 based Return Routability Test (RRT) to be executed by the correspondent router 13*b*; the validation resource 46 also is configured for responding to validation queries from the correspondent node 13*b*. The home address/care-of address validation resource 46, in response to receiving two secure validation keys from the correspondent router 13 via the care-of address (via the path 15*c*) and the home address (via the tunnel 15*a*) of the mobile router, forwards the two secure validation keys to the binding update resource, enabling the binding update resource 44 to output to the correspondent router 13*b* a binding update request that includes the validation keys. Hence, the binding update request enables the correspondent router to verify that the home agent address of the mobile router 12 is reachable via the care of address (via the tunnel 15*c*).

Figure 3:
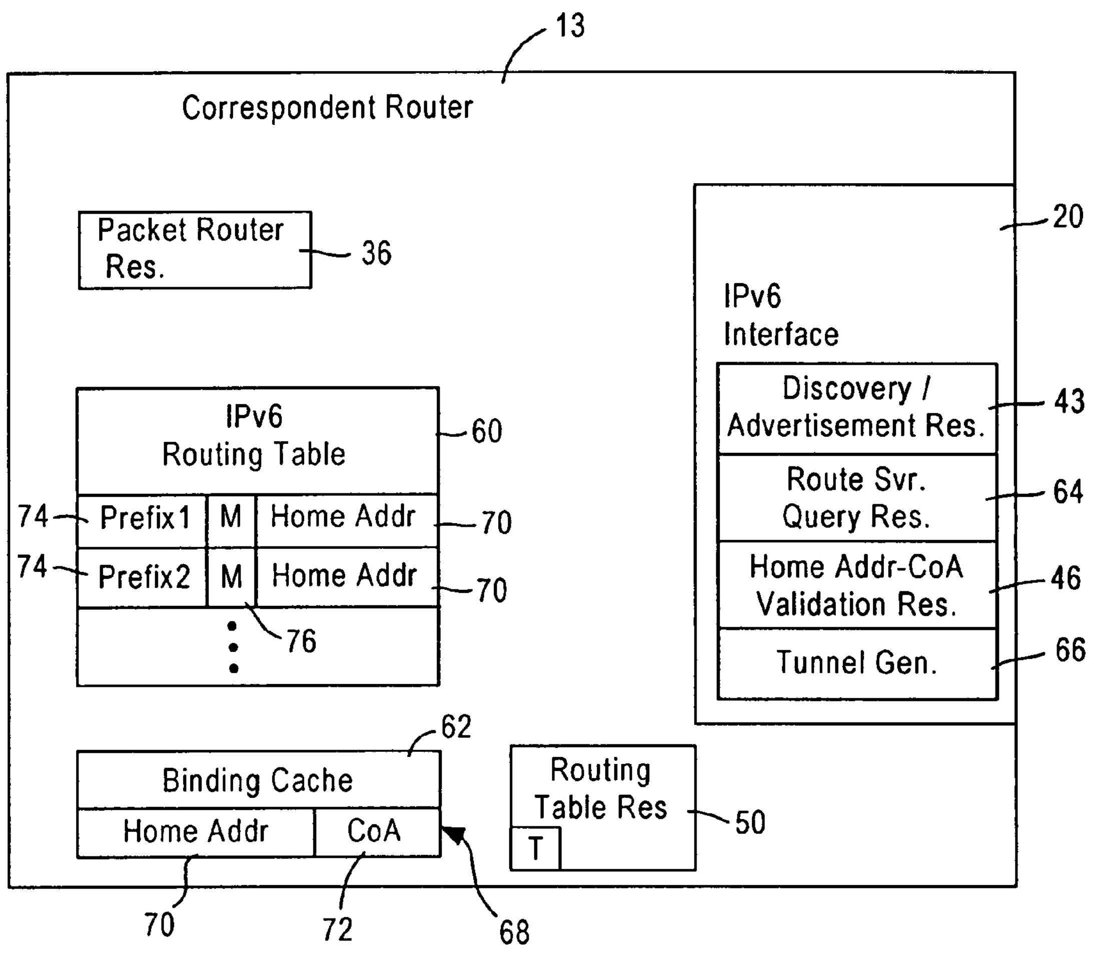
FIG. 3 is a diagram illustrating in detail the correspondent router of FIG. 1.

FIG. 3 is a diagram illustrating the correspondent router 13, according to an embodiment of the present invention. The correspondent router 13 is essentially functionally equivalent to the mobile router 12, except that the correspondent router may optionally include the mobile IP-based resources (e.g., IGP or MANET routing table), depending on whether the correspondent router 13*b* is implemented as a mobile router. Typically, however, the correspondent router 13 includes at least an IPv6 interface 20, a packet router resource 36, a routing table resource 50, an IPv6 routing table 60, and a binding cache 62.

The IPv6 interface 20 includes a discovery/advertisement resource 43, a route server query resource 64, a home address-care of address validation resource 46, and a tunnel generator 66. The discovery resource 43 is configured for receiving a binding update request from the mobile router 12 via the unidirectional tunnel 15*b*. The binding update request specifies a home address for the mobile router, a care-of address for the mobile router, and a mobile router flag (M) specifying that the binding update was generated by a mobile router, and security keys that validate for the correspondent router 13 that the home address of the mobile router 12 is reachable via the care-of address. The tunnel generator 66 is configured for selectively establishing a bidirectional tunnel 15*d* to the mobile router 12 by entering the binding update request in a binding cache entry 68, indicating the home address 70 is reached by the care-of address 72, based on the validation resource 46 verifying that the home address 70 is reachable via the care-of address 72.

The validation resource 46 is configured for initiating a return routability test (RRT) in response to an RRT request from the mobile router 12, described below. Once the correspondent router 13 has established the bidirectional tunnel 15*d* and added the binding cache entry 68 to the binding cache 62, the route server query resource 64 sends a query to the route server resources 100, described below. In particular, the authoritative name server identifier resource 82 requests the address prefixes served by the mobile router 12, to enable the correspondent router 13 to send all traffic for the identified prefixes to the mobile router 12 via the bidirectional tunnel 15*d*. Hence, the correspondent router 13 and the mobile router 12 can optimize routing paths for all subnet prefixes reachable via the respective routers 12 and 13 bypassing all relevant traffic via the bidirectional tunnel 15*d*.

The routing table resource 50 is configured for updating the routing table 60 to specify that the address prefixes 74 served by the mobile router 12, as identified by the route server query resource 64, is reachable via the home address 70. The mobile router flag (M) 76 specifies that the home address 70 points to a mobile node. Hence, the packet router resource 36, in response to detecting the mobile router flag 76, accesses the binding cache entry 68 for the matching home address 70 to obtain the corresponding care-of address for forwarding a packet via the tunnel 15*d*. As described below, the tunnel 15*d* can be re-established in the event that the mobile router 12 moves to a new care of address, merely by adding a new binding cache entry 68 that specifies the new care of address 72 for the corresponding home address 70.

FIGS. 4A and 4B are diagrams illustrating the method by the mobile router 12 and the correspondent router 13*b* of obtaining routing information for generating optimized routing paths based on establishment of the bidirectional tunnel 15*d*, according to an embodiment of the present invention. The steps described in FIGS. 4A and 4B can be implemented as executable code stored on a computer readable medium (e.g., a hard disk drive, a floppy drive, a random access memory, a read only memory, an EPROM, a compact disk, etc.), or propagated via a computer readable medium (e.g., a transmission wire, an optical fiber, a wireless transmission medium utilizing an electromagnetic carrier wave, etc.).

Initially the mobile router 12 and the correspondent router 13*b* need to be registered with their address prefixes with their respective name servers 100. This registration can be implemented statically or dynamically. An example of static registration is a system administrator for the domain configuring the routers' prefixes in the name server. As an example of dynamic registration, the home agent 18 may register all of its mobile routers, based on their respective home addresses assigned to a domain name shared with the home agent 18, with respective name servers 100 configured for performing forward and reverse lookup for the domain name of the home agent 18. The correspondent router 13*b* also registers its address prefixes with name servers according to prescribed DNS protocols and in accordance with the resource records described below.

The method of FIG. 4A continues in step 90, in response to the discovery resource 43 of the mobile router 12 detecting a threshold amount of traffic to/from the correspondent node 24 (Host_B) (or to nodes within an identified subnet prefix). The reverse lookup resource 80 of the mobile router 12 sends in step 92 a reverse lookup query specifying the IP address of the correspondent node 24, via the tunnel 15*a* to the home agent 18. The query requests identification of a domain name for identifying correspondent router for the correspondent node 24 (or identified subnet prefix). The home agent 18 forwards the request to the name server 100*a*, which responds by outputting a Pointer (PTR) resource specifying a domain name for the specified IP address. In response to receiving in step 94 the PTR resource via the tunnel 15*a*, the authoritative name server identifier resource 82 initiates in step 96 a recursive lookup, starting with the root name server 100*b*, to identify the authoritative name server 100*d* or 100*e*. The authoritative name server identifier resource 82 sends the query to the authoritative name server (e.g., 100*d*) via the tunnel 15*a* in step 98 to verify the IP address for the correspondent node 24. If in step 110 there is a match between the IP address supplied by the authoritative name server 100*e* and the IP address detected in step 90, the query resource 64 verifies that the IP address is accurate and that the name server can be trusted. If in step 110 there is no match, then the name server cannot be trusted and processing is halted in step 112.

The authoritative name server identifier resource 82 outputs in step 114 a second query via the tunnel 15*a* for the correspondent router of the host (Host_B). In particular, the authoritative name server identifier resource 82 may be configured for specifying a specific resource record type 106, or by specifying a specific subdomain request 104. As illustrated in FIGS. 5 and 6A, the authoritative name server 100*e* may be configured for storing the routing information in the form of new resource record types 106. In particular, correspondent routers configured for route optimization may be specified by the new resource record type 106*a* ("NEMO.CR"), address prefixes reachable by such correspondent routers may be specified by the new resource record type 106*b* ("NEMO-.PREFIX"), and address prefixes reachable by mobile routers within the same domain may be specified by the new resource record type 106*c* ("NEMO.MR.PREFIX"). In such a case, the authoritative name server identifier resource 82 would execute step 114*a* of FIG. 6A for requesting the IP address for the correspondent router, and may also request the associated prefixes, for reaching the host (Host_B).

Alternately, the authoritative name server 100*e* may be configured for storing the routing information in the form of a subdomains 104, where correspondent routers are specified within the subdomain 104*a* ("cr.nemo.example.com"), address prefixes reachable by associated correspondent routers are specified within the subdomain 104*b* ("prefix-.nemo.example.com"), and address prefixes reachable by associated mobile routers are specified within the subdomain 104*c* ("prefix.mr.nemo.example.com"). In such a case, the authoritative name server identifier resource 82 would execute step 114*b* of FIG. 6A for requesting the IP address for the correspondent router, and may also request the associated prefixes, for reaching the host (Host_B).

Once the mobile router 12 receives in step 116 the IP address for the correspondent router and the associated prefixes reachable by the correspondent router 13*b*, the discovery resource 43 of the mobile router 12 causes the routing table resource 50 to establish a unidirectional tunnel 15*b* by updating the routing table 34 to specify the subnet prefix 38 of the correspondent node 24 and the IP address 40 of the correspondent router 13*b*. Once the tunnel 15*b* is established, the mobile router can begin sending packets received from the mobile network host 16 by tunneling the received packet to the correspondent router 13*b*, using Ipv6 encapsulation as described in the IETF Request for Comments (RFC) 2473. The correspondent router 13*b* decapsulates the packet from the tunnel, and forwards the packet to the correspondent node 24.

Since the mobile router 12 does not have a security association with the correspondent router 13*b*, the mobile router 12 needs to enable the correspondent router to verify that its home address is reachable via the care-of address. The validation resource 46 of the mobile router 12 outputs a return routability test (RRT) request to the correspondent router 13*b* via the unidirectional tunnel 15*b*. The RRT request specifies the home address 70 for the mobile router 12, a corresponding care of address 72 for the mobile router 12, and a mobile router flag 76 specifying that the source of the binding update request is a mobile router.

The discovery resource 43 of the correspondent router 13, in response to receiving the RRT request, causes the validation resource 46 to validate that the home address 70 is reachable by the care of address 72 specified in the binding update request. In particular, the validation resource 46 of the correspondent router 13 sends a first packet, having a first secure key, to the home address for the mobile router 12; the packet is received by the home agent 18, which forwards the packet via the tunnel 15*a* to the mobile router 12. The validation resource 46 of the correspondent router 13 sends a second packet, having a second secure key, to the care of address for the mobile router 12.

The validation resource 46 of the mobile router 12, in response to receiving the packets having the respective first and second secure keys, passes the keys to the binding update resource 44. The binding update resource 44 sends a binding update request that includes the first and second secure keys that were sent to the home address and care of address, respectively, as well as the home address 70, the care-of address 72, and the mobile flag 76. Hence, the validation resource 46 in the correspondent router 13 verifies that the home address 70 is reachable via the care of address 72 based on receiving the packet that includes the first secure key and the second secure key.

FIG. 4B illustrates the steps by the route server query resource 64 in the correspondent router 13*b* to obtain the address prefix for the mobile network host (Host_A) 16, and/or all address prefixes reachable by the correspondent router 13*b* via the bidirectional tunnel 15*d*. The tunnel generator 66 of the correspondent router 13*b* establishes the bidirectional tunnel 15*d* by entering in step 120 the binding update request in the binding cache entry 62, and sending a binding acknowledgment to the mobile router 12 via the tunnel 15*d* (i.e., via the care of address).

The reverse lookup resource 80 of the correspondent router 13*b* sends in step 122 a reverse lookup query specifying the home address of the mobile router 12. The query requests identification of a domain name for identifying mobile router 12. The name server 100*a* responds by outputting a Pointer (PTR) resource specifying a domain name for the specified IP address. In response to receiving in step 124 the PTR resource, the authoritative name server identifier resource 82 of the correspondent router 13*b* initiates in step 126 a recursive lookup, starting with the root name server 100*b*, to identify the authoritative name server 100*d* or 100*e* for the domain of the mobile router 12. The authoritative name server identifier resource 82 of the correspondent router 13*b* sends the query to the authoritative name server (e.g., 100*d*) in step 128 to verify the home address for the mobile router 12. If in step 130 there is a match between the IP address supplied by the authoritative name server 100*e* and the IP address previously detected by the correspondent router 13*b*, the query resource 64 verifies that the IP address is accurate and that the name server can be trusted. If in step 130 there is no match, then the name server cannot be trusted and processing is halted in step 132.

The authoritative name server identifier resource 82 outputs in step 134 a second query for the prefixes reachable via the mobile router 12. As described above, the authoritative name server identifier resource 82 may be configured to generate in step 134*a* of FIG. 6B the query for new resource records 106*c*. Alternatively, the authoritative name server identifier resource 82 may be configured to generate in step 134*b* of FIG. 6B the query using prescribed subdomains 104*c*.

Upon receiving in step 136 a reply from the authoritative name server 100*e* that specifies the address prefixes served by the mobile router, the route server query resource 64 causes the routing table resource 50 to update the routing table 60 to specify the address prefixes 74 served by the mobile router 12 based on its corresponding home address 70. Since the routing table 60 includes a mobile router flag 76, the packet router resource 36 can encapsulate any messages received from the correspondent node 24 for transfer via the bidirectional tunnel.

According to the disclosed embodiment, a reactive route server protocol enables routing paths between the mobile router and an arbitrary correspondent router to be established and optimized.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an Internet Protocol (IP) based mobile router configured for sending packets to a correspondent node, the method comprising:

receiving by the mobile router a packet destined for an IP address of the correspondent node;

determining by the mobile router a host domain name associated with the IP address by requesting a reverse lookup of the IP address from a name server;

identifying by the mobile router an authoritative name server for the host domain name based on generating and sending a query, specifying the host domain name obtained from the reverse lookup of the IP address, to a root name server for identification of the authoritative name server, and generating and sending a second query, specifying the host domain name obtained from the reverse lookup of the IP address, to the authoritative name server to determine if the authoritative name server sends a second IP address matching the IP address of the correspondent node;

generating and sending by the mobile router to the authoritative name server a request for identifying a correspondent router configured for establishing a tunnel for the host domain name, based on the authoritative name server sending the second IP address matching the IP address of the correspondent node; and the mobile router initiating establishment of the tunnel, as a bidirectional tunnel that bypasses a home agent of the mobile router, with the correspondent router for sending packets to the correspondent node based on information received by the mobile router from the authoritative name server and responsive to the request sent by the mobile router.

2. The method of claim 1, wherein the sending step includes sending a second request for identifying an address prefix for the correspondent node that is reachable by the correspondent router, the method further including updating a routing table with the address prefix, received from the authoritative name server, for reaching additional nodes via the tunnel and that are within a subnetwork specified by the address prefix.

3. The method of claim 2, wherein the sending step includes:

specifying in the request a first resource record type configured for specifying correspondent routers configured for establishing the tunnel according to a prescribed mobile network protocol; and specifying in the second request a second resource record type configured for specifying the address prefix for the correspondent node according to the prescribed mobile network protocol.

4. The method of claim 2, wherein the sending step includes:

sending the request to a first prescribed subdomain of the authoritative name server associated with identification of correspondent routers configured for establishing the tunnel according to a prescribed mobile network protocol;

sending the second request to a second prescribed subdomain of the authoritative name server associated with identification of address prefixes for identified nodes.

5. The method of claim 1, wherein the identifying step includes recursively sending the host name, following receiving a reply to the second query that specifies an identified name server, to successively identified name servers for identification of the authoritative name server.

6. The method of claim 1, wherein:

the determining step includes sending a query, specifying the reverse lookup, via a home tunnel terminated by the home agent, and the initiating step includes:

(1) sending a binding update request to the correspondent router via a unidirectional tunnel to the correspondent router, the binding update request specifying a corresponding home address providing reachability to the mobile router via the home agent, a corresponding care-of address providing reachability to the mobile router via an attachment router, and a mobile router flag specifying that the binding update request was generated by a router that is mobile, and (2) validating for the correspondent router that the home address is reachable via the care-of address.

7. A method in an Internet Protocol (IP) based router configured for sending and receiving packets for a correspondent node, the method comprising:

establishing by the router a bidirectional tunnel with a mobile router based on receiving a binding update that specifies a home address for the mobile router and a care-of address that specifies a point of attachment for the mobile router;

determining by the router a domain name associated with the home address by requesting a reverse lookup of the home address from a name server;

identifying by the router an authoritative name server for the domain name determined from the reverse lookup based on generating and sending a query, specifying the domain name, to a root name server for identification of the authoritative name server, and generating and sending a second query, specifying the domain name determined from the reverse lookup, to the authoritative name server to verify whether the authoritative name server can be trusted;

generating and sending by the router to the authoritative name server a request for identifying at least one address prefix reachable via the mobile router based on verifying the authoritative name server can be trusted; and updating by the router an internal routing table to indicate the at least one address prefix is reachable via the bidirectional tunnel based on information received by the router from the authoritative name server and responsive to the request sent by the router.

8. The method of claim 7, wherein the sending step includes specifying within the request the address prefix for a mobile node having sent a packet to the correspondent node and being reachable via the mobile router, the updating step including updating the internal routing table to indicate the address prefix for the mobile node is reachable via the bidirectional tunnel.

9. The method of claim 8, wherein the sending step further includes specifying in the request a first resource record type configured for specifying the prefix for a specified mobile node and assigned to a corresponding mobile router configured for establishing the bidirectional tunnel according to a prescribed mobile network protocol.

10. The method of claim 8, wherein the sending step further includes sending the request to a prescribed subdomain of the authoritative name server associated with identification of an address prefix for a specified mobile node and assigned to a corresponding mobile router configured for establishing the bidirectional tunnel according to a prescribed mobile network protocol.

11. The method of claim 7, wherein the sending step includes specifying within the request all address prefixes reachable via the mobile router, the updating step including updating the internal routing table to indicate said all address prefixes are reachable via the bidirectional tunnel.

12. The method of claim 11, wherein the sending step further includes specifying in the request a first resource record type configured for specifying all prefixes assigned to a corresponding mobile router configured for establishing the bidirectional tunnel according to a prescribed mobile network protocol.

13. The method of claim 11, wherein the sending step further includes sending the request to a prescribed subdomain of the authoritative name server associated with identification of all address prefixes assigned to a corresponding mobile router configured for establishing the bidirectional tunnel according to a prescribed mobile network protocol.

14. An Internet Protocol (IP) based mobile router configured for sending packets to a correspondent node, the mobile router comprising:

means for receiving a packet destined for an IP address of the correspondent node;

means for determining a host domain name associated with the IP address by requesting a reverse lookup of the IP address from a name server;

means for identifying an authoritative name server for the host domain name based on generating and sending a query, specifying the host domain name obtained from the reverse lookup of the IP address, to a root name server for identification of the authoritative name server, and generating and sending a second query, specifying the host domain name obtained from the reverse lookup of the IP address, to the authoritative name server to determine if the authoritative name server sends a second IP address matching the IP address of the correspondent node, the means for identifying configured for generating and sending to the authoritative name server a request for identifying a correspondent router configured for establishing a tunnel for the host domain name, based on the authoritative name server sending the second IP address matching the IP address of the correspondent node; and means for initiating establishment of the tunnel, as a bidirectional tunnel that bypasses a home agent of the mobile router, with the correspondent router for sending packets to the correspondent node based on information received by the mobile router from the authoritative name server and responsive to the request sent by the mobile router.

15. The mobile router of claim 14, wherein the identifying means is configured for sending a second request for identifying an address prefix for the correspondent node that is reachable by the correspondent router, the mobile router further comprising updating a routing table with the address prefix, received from the authoritative name server, for reaching additional nodes via the tunnel and that are within a subnetwork specified by the address prefix.

16. The mobile router of claim 15, wherein the identifying means is configured for:

specifying in the request a first resource record type configured for specifying correspondent routers configured for establishing the tunnel according to a prescribed mobile network protocol; and specifying in the second request a second resource record type configured for specifying the address prefix for the correspondent node according to the prescribed mobile network protocol.

17. The mobile router of claim 15, wherein the identifying means is configured for:

sending the request to a first prescribed subdomain of the authoritative name server associated with identification of correspondent routers configured for establishing the tunnel according to a prescribed mobile network protocol; and sending the second request to a second prescribed subdomain of the authoritative name server associated with identification of address prefixes for identified nodes.

18. The mobile router of claim 14, wherein the identifying means is configured for recursively sending the host name, following receiving a reply to the second query that specifies an identified name server, to successively identified name servers for identification of the authoritative name server.

19. The mobile router of claim 14, wherein:

the determining means is configured for sending a query, specifying the reverse lookup, via a home tunnel terminated by the home agent, and the initiating means is configured for:

(1) sending a binding update request to the correspondent router via a unidirectional tunnel to the correspondent router, the binding update request specifying a corresponding home address providing reachability to the mobile router via the home agent, a corresponding care-of address providing reachability to the mobile router via an attachment router, and a mobile router flag specifying that the binding update request was generated by a router that is mobile, and (2) validating for the correspondent router that the home address is reachable via the care-of address.

20. An Internet Protocol (IP) based router configured for sending and receiving packets for a correspondent node, the router comprising:

means for establishing a bidirectional tunnel with a mobile router based on receiving a binding update that specifies a home address for the mobile router and a care-of address that specifies a point of attachment for the mobile router;

means for determining a domain name associated with the home address by requesting a reverse lookup of the home address from a name server;

means for identifying an authoritative name server for the domain name determined from the reverse lookup based on generating and sending a query, specifying the domain name, to a root name server for identification of the authoritative name server, and generating and sending a second query, specifying the domain name determined from the reverse lookup, to the authoritative name server to verify whether the authoritative name server can be trusted, the identifying means configured for generating and sending to the authoritative name server a request for identifying at least one address prefix reachable via the mobile router based on the means for identifying verifying that the authoritative name server can be trusted; and means for updating an internal routing table to indicate the at least one address prefix is reachable via the bidirectional tunnel based on information received by the router from the authoritative name server and responsive to the request sent by the router.

21. The router of claim 20, wherein the identifying means is configured for specifying within the request the address prefix for a mobile node having sent a packet to the correspondent node and being reachable via the mobile router, the updating means configured for updating the internal routing table to indicate the address prefix for the mobile node is reachable via the bidirectional tunnel.

22. The router of claim 21, wherein the identifying means is configured for specifying in the request a first resource record type configured for specifying the prefix for a specified mobile node and assigned to a corresponding mobile router configured for establishing the bidirectional tunnel according to a prescribed mobile network protocol.

23. The router of claim 21, wherein the identifying means is configured for sending the request to a prescribed subdomain of the authoritative name server associated with identification of an address prefix for a specified mobile node and assigned to a corresponding mobile router configured for establishing the bidirectional tunnel according to a prescribed mobile network protocol.

24. The router of claim 20, wherein the identifying means is configured for specifying within the request all address prefixes reachable via the mobile router, the updating means configured for updating the internal routing table to indicate said all address prefixes are reachable via the bidirectional tunnel.

25. The router of claim 24, wherein the identifying means is configured for specifying in the request a first resource record type configured for specifying all prefixes assigned to a corresponding mobile router configured for establishing the bidirectional tunnel according to a prescribed mobile network protocol.

26. The router of claim 24, wherein the identifying means is configured for sending the request to a prescribed subdomain of the authoritative name server associated with identification of all address prefixes assigned to a corresponding mobile router configured for establishing the bidirectional tunnel according to a prescribed mobile network protocol.

27. An Internet Protocol (IP) based mobile router configured for sending packets to a correspondent node, the mobile router comprising:

a query circuit configured for determining a host domain name associated with an IP address of the correspondent node based on requesting a reverse lookup of the IP address from a name server, the query circuit further configured for identifying an authoritative name server for the host domain name based on generating and sending a query, specifying the host domain name obtained from the reverse lookup of the IP address, to a root name server for identification of the authoritative name server, and generating and sending a second query, specifying the host domain name obtained from the reverse lookup of the IP address, to the authoritative name server to determine if the authoritative name server sends a second IP address matching the IP address of the correspondent node, the query circuit configured for generating and sending to the authoritative name server a request for identifying a correspondent router configured for establishing a tunnel for the host domain name, based on the authoritative name server sending the second IP address matching the IP address of the correspondent node;

the mobile router configured for initiating establishment of the tunnel, as a bidirectional tunnel that bypasses a home agent of the mobile router, with the correspondent router for sending packets to the correspondent node based on information received by the mobile router from the authoritative name server and responsive to the request sent by the mobile router.

28. The mobile router of claim 27, wherein the query circuit is configured for sending a second request for identifying an address prefix for the correspondent node that is reachable by the correspondent router, the mobile router further comprising a routing table for storing the address prefix, received from the authoritative name server, for reaching additional nodes via the tunnel and that are within a subnetwork specified by the address prefix.

29. The mobile router of claim 28, wherein the query circuit is configured for:

specifying in the request a first resource record type configured for specifying correspondent routers configured for establishing the tunnel according to a prescribed mobile network protocol; and specifying in the second request a second resource record type configured for specifying the address prefix for the correspondent node according to the prescribed mobile network protocol.

30. The mobile router of claim 28, wherein the query circuit is configured for:

sending the request to a first prescribed subdomain of the authoritative name server associated with identification of correspondent routers configured for establishing the tunnel according to a prescribed mobile network protocol; and sending the second request to a second prescribed subdomain of the authoritative name server associated with identification of address prefixes for identified nodes.

31. The mobile router of claim 27, wherein the query circuit is configured for recursively sending the host name, following receiving a reply to the second query that specifies an identified name server, to successively identified name servers for identification of the authoritative name server.

32. The mobile router of claim 27, wherein the query circuit is configured for sending a query, specifying the reverse lookup, via a home tunnel terminated by the home agent, the mobile router further comprising:

a binding update circuit configured for sending a binding update request to the correspondent router via a unidirectional tunnel to the correspondent router, the binding update request specifying a corresponding home address providing reachability to the mobile router via the home agent, a corresponding care-of address providing reachability to the mobile router via an attachment router, and a mobile router flag specifying that the binding update request was generated by a router that is mobile; and a validation circuit configured for validating for the correspondent router that the home address is reachable via the care-of address.

33. An Internet Protocol (IP) based router configured for sending and receiving packets for a correspondent node, the router comprising:

a first circuit configured for establishing a bidirectional tunnel with a mobile router based on receiving a binding update that specifies a home address for the mobile router and a care-of address that specifies a point of attachment for the mobile router;

a query circuit configured for determining a domain name associated with the home address based on requesting a reverse lookup of the home address from a name server, the query circuit configured for identifying an authoritative name server for the domain name determined from the reverse lookup based on generating and sending a query, specifying the domain name, to a root name server for identification of the authoritative name server, and generating and sending a second query, specifying the domain name determined from the reverse lookup, to the authoritative name server to verify whether the authoritative name server can be trusted, the query circuit configured for generating and sending to the authoritative name server a request for identifying at least one address prefix reachable via the mobile router based on the query circuit verifying the authoritative name server can be trusted; and a routing table configured for identifying the at least one address prefix is reachable via the bidirectional tunnel based on information received by the router from the authoritative name server and responsive to the request sent by the router.

34. The router of claim 33, wherein the query circuit is configured for specifying within the request the address prefix for a mobile node having sent a packet to the correspondent node and being reachable via the mobile router, the internal routing table updated to indicate the address prefix for the mobile node is reachable via the bidirectional tunnel.

35. The router of claim 34, wherein the query circuit is configured for specifying in the request a first resource record type configured for specifying the prefix for a specified mobile node and assigned to a corresponding mobile router configured for establishing the bidirectional tunnel according to a prescribed mobile network protocol.

36. The router of claim 34, wherein the query circuit is configured for sending the request to a prescribed subdomain of the authoritative name server associated with identification of an address prefix for a specified mobile node and assigned to a corresponding mobile router configured for establishing the bidirectional tunnel according to a prescribed mobile network protocol.

37. The router of claim 33, wherein the query circuit is configured for specifying within the request all address prefixes reachable via the mobile router, the internal routing table updated to indicate said all address prefixes are reachable via the bidirectional tunnel.

38. The router of claim 37, wherein the query circuit is configured for specifying in the request a first resource record type configured for specifying all prefixes assigned to a corresponding mobile router configured for establishing the bidirectional tunnel according to a prescribed mobile network protocol.

39. The router of claim 37, wherein the query circuit is configured for sending the request to a prescribed subdomain of the authoritative name server associated with identification of all address prefixes assigned to a corresponding mobile router configured for establishing the bidirectional tunnel according to a prescribed mobile network protocol.

* * * * *